United States Patent

Prainito

[11] Patent Number: 5,897,933
[45] Date of Patent: Apr. 27, 1999

[54] METHOD OF MANUFACTURE OF TERRY CLOTH ITEMS

[75] Inventor: Francesco Attilio Prainito, Canning Vale, Australia

[73] Assignee: Canning Vale Weaving Mills Ltd, Australia

[21] Appl. No.: 08/793,743

[22] PCT Filed: Aug. 29, 1995

[86] PCT No.: PCT/AU95/00548

§ 371 Date: Mar. 4, 1997

§ 102(e) Date: Mar. 4, 1997

[87] PCT Pub. No.: WO96/07782

PCT Pub. Date: Mar. 14, 1996

[30] Foreign Application Priority Data

Sep. 7, 1994 [AU] Australia ............ PM7929
Apr. 21, 1995 [AU] Australia ............ 16585/95
Jun. 9, 1995 [AU] Australia ............ PN3514

[51] Int. Cl.$^6$ ............ B29C 59/02; D02G 3/02; D03D 27/08
[52] U.S. Cl. ............ 428/85; 139/396; 264/103; 264/132; 264/293; 264/322; 264/324; 428/195; 442/213; 442/214; 442/216
[58] Field of Search ............ 264/103, 132, 264/293, 322, 324; 428/85, 195; 442/213, 214, 216; 139/396

[56] References Cited

U.S. PATENT DOCUMENTS

| 3,721,273 | 3/1973 | Sherrill et al. | 139/396 |
| 4,462,683 | 7/1984 | Hiraba | 355/77 |
| 4,984,606 | 1/1991 | Moore et al. | 139/396 |

FOREIGN PATENT DOCUMENTS

| 515206 | 11/1992 | European Pat. Off. |
| 3835046 | 4/1990 | Germany. |
| 525162 | 8/1940 | United Kingdom. |

OTHER PUBLICATIONS

Abstract of Japan 5–86538 (Published Apr. 6, 1993).
Abstract of Japan 6–284987 (Published Oct. 11, 1994).
Abstract of Japan 2–6646 (Published Jan. 10, 1990).
Abstract of Japan 5–156542 (Published Jun. 22, 1993).
Abstract of Japan 6–257076 (Published Sep. 13, 1994).

*Primary Examiner*—Leo B. Tentoni
*Attorney, Agent, or Firm*—Fish & Richardson P.C.

[57] ABSTRACT

A method is described for manufacturing an item of terry cloth that incorporates a decorative panel. The item of terry cloth is woven with a panel that is loopless and double-sided. At least one face of the panel is formed of a synthetic fusible fiber. The fusible fiber is at least partially fused by applying heat and pressure to the face of the panel, thereby forming a smooth patterned surface on the face of the panel.

120 Claims, 2 Drawing Sheets

P - POLYESTER

C - COTTON

16 ENDS

P - PILE
G - GROUND

FIG. 1

METHOD OF MANUFACTURE OF TERRY CLOTH ITEMS

BACKGROUND OF THE INVENTION

THIS INVENTION relates to the weaving of textile formed of terry cloth such as towels and the like.

In order to apply a pattern to terry cloth, there are several limitations upon the manner in which the pattern can be applied. The principal reason for this difficulty relates to the nature of the terry cloth which by its nature does not lend itself to a detailed pattern. Generally, in the past, a pattern has been applied to items formed of terry cloths such as a towel by weaving a pattern into the cloth. Though proposals have been made in the past for printing patterns onto towels and other terry cloth items, these methods have-generally been unsatisfactory for several reasons. One of the principle reasons comprises the textured characteristic of the terry cloth which prevents a detailed and distinct pattern being printed onto the towel.

In order to achieve an improved definition in design reproduction, proposals have been made to shear the terry loops from the cloth, however this is costly arid can substantially detract from the principal function of the towel which is to absorb and store moisture. Another proposal for applying printed or relief patterns to towels has comprised utilising a panel which may comprise a header panel at one or both ends of the towel and weaving into that panel a decorative pattern. There have also been proposals to apply printed or relief patterns to the panels.

It is however, not generally possible to apply a printed pattern directly onto the header panel of a towel since the dyes used in the printing process are washed from the cotton fibre in normal use of the towel. To date, the only successful means of providing a printed header panel has generally comprised the application of a separate piece of printed fabric over the towel in the region of the header panel. This technique however suffers from the difficulty that the separate piece of material is of a different nature to the terry cloth of which the towel is formed and therefore can have differing shrinkage characteristics to the remainder of the towel. Furthermore, the stitching retaining the separate piece of fabric to the towel can be damaged causing the separate piece to be separated from the towel resulting in a rapid deterioration of the appearance of the towel.

In situations where the pattern is three dimensional, it has been the practice to shear the terry loops from the cloth to form the pattern. However, this as indicated above, is costly and detracts from the absorption characteristics of the towel. Other methods have included use of a specialised weaving technique to achieve the relief pattern however, this can add significantly to the cost of the towel.

It is an object of this invention to provide a technique whereby a pattern can be applied to a panel of a item formed of terry cloth whereby the pattern is stable.

SUMMARY OF THE INVENTION

Accordingly, the invention resides in a method of manufacturing an item formed of terry cloth having a decorative panel said method comprising weaving an item of terry cloth with a panel which is loopless and is double sided where at least one face of the panel is substantially formed of synthetic fusible fibre, applying heat and pressure to the at least one face to at least partially fuse the fusible fibre and to form a patterned surface on the at least one face.

According to a preferred feature of the invention, the other face of the terry cloth item is formed from fibre substantially corresponding to the remainder of the terry cloth item.

According to an alternative preferred feature of the invention both faces of the terry cloth item can be formed from the synthetic fusible fibre.

According to a further preferred feature of the invention, the synthetic fusible fibre comprises polyester fibre.

One embodiment of the invention comprises the method of manufacturing an item formed of terry cloth having a decorative printed panel, said method comprising weaving the item of terry cloth with a panel which is loopless and is double sided, where at least one face of the panel is substantially formed of synthetic fusible fibre, applying heat and pressure to the at least one face to form a smooth substantially uniform surface and applying a decorative printed pattern to the one face.

According to a further preferred feature of the above embodiment, the application of heat, pressure and the printed pattern is effected substantially simultaneously. It is preferred that the printed pattern is applied by application of a transfer master over the panel prior to the application of heat and pressure to the panel. It can be a feature of the embodiment that the pattern is also three dimensional. The creation of the pattern can be affected by a heated platen which is applied under pressure to the at least one face wherein the surface of the platen is formed with a relief pattern. At least a portion of the relief pattern may correspond with the printed pattern.

Another embodiment of the invention comprises a method of manufacturing an item formed of terry cloth having a decorative panel formed with a relief pattern said method comprising weaving the item of terry cloth with a panel which is loopless and double sided, where at least one face of the panel is substantially formed of synthetic fusible fibre, applying heat and pressure to the at least one face to form a patterned surface comprising a relief pattern. The application of the heat and pressure can in accordance with one preferred feature of the embodiment be effected by the application of a heated platen to the at least one face under pressure where the surface of the platen is formed with a relief pattern.

According to a further preferred feature of the above embodiment, the fusible fibre comprises a yam formed of viscose fibre.

According to one feature of the embodiment, the synthetic fusible fibre. can be of the form of coarse viscose chenille yam.

According to a further preferred feature of the invention, the terry cloth item comprises a towel.

The invention will be more fully understood in the light of the following description of several specific embodiments. The description is made with reference to the accompanying drawings of which:

BRIEF DESCRIPTION OF THE DRAWINGS

FIG. 1 is a peg plan which illustrates the weaving pattern of the header panel of a towel manufactured according to the method of the first embodiment.

DESCRIPTION OF PREFERRED EMBODIMENTS

Figure 2:
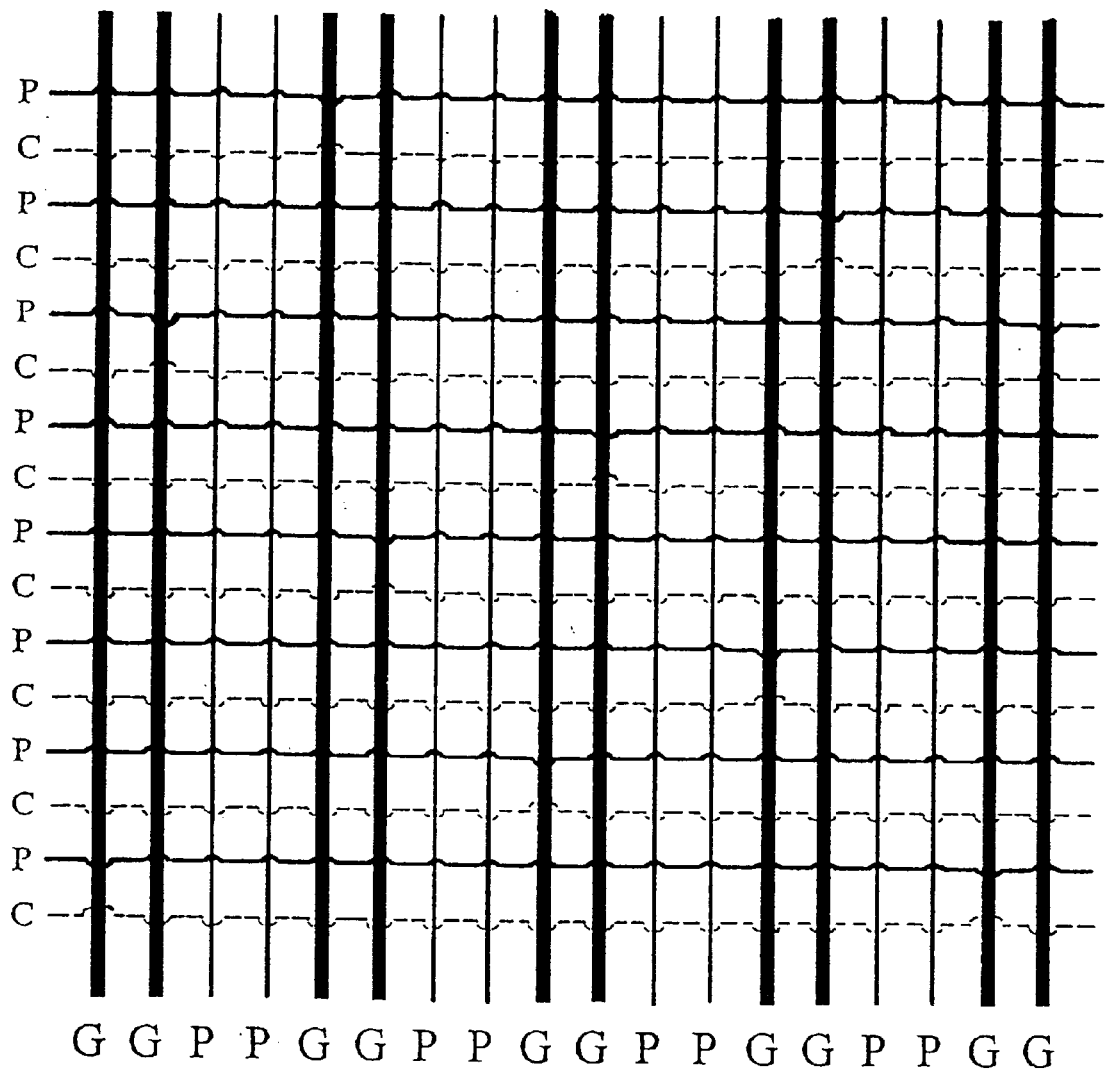
FIG. 2 is a schematic illustration of the weaving pattern illustrated in FIG. 1.

The first embodiment of the invention relates to the manufacture of cotton towels which are formed with a panel which is capable of being printed and whereby the printed pattern is resistant to washing and whereby the surface of the panel can accept a detailed pattern with little loss of definition. The towel is woven according to the embodiment according to conventional practice with the exception of one or more panels which may be provided on the towel.

Figure 1:
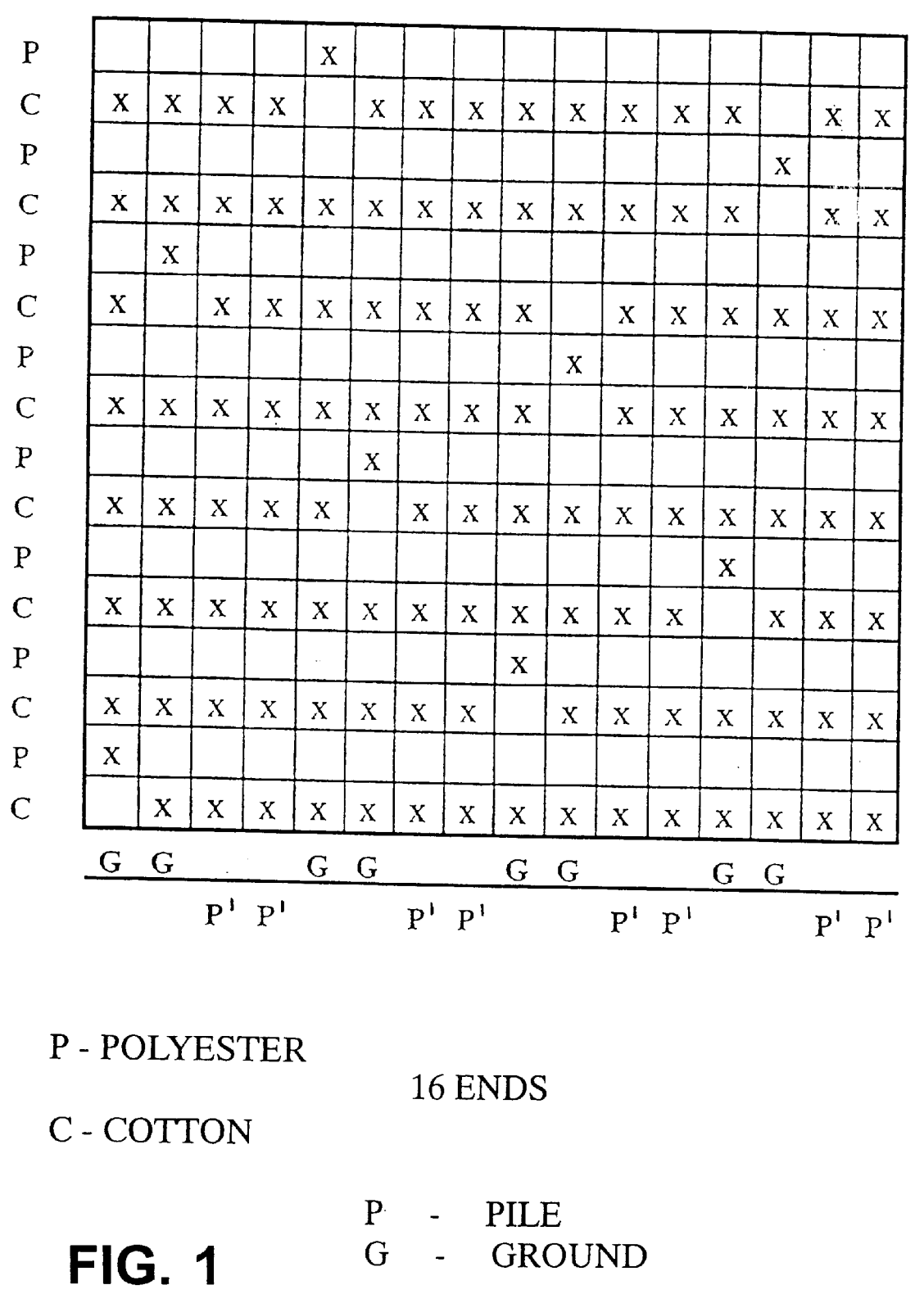

Each panel is formed as a double-sided loopless panel. The weaving of the panel is effected utilising two differing weft yams in accordance with the peg plan shown at FIG. 1 where one yam P is formed of a synthetic fusible fibre such as polyester and the other weft yarn C is formed of the same fibre as the remainder of the towels. The weft yams P and C are alternatively woven across the two warp yarns P and G which comprise the pile and ground yams respectively in accordance with the peg plan shown at FIG. 1 and which is woven such that it is positioned to lie predominantly on one face of the panel and the cotton weft yarn C is positioned to lie predominantly on the other face of the panel. There is only limited exposure of yarn which predominantly lies at one face of the panel, at the opposed face of the panel.

The effect of the weaving process according to the method described above is that the weft yarns are floated to one or the other surface of the panel arid such that they are formed as a loose weave on the respective surface of the panel. The result is that the one face of the panel is such that it is substantially composed of the synthetic fibre although as a result of the weaving process, some of the cotton yarn does extend through to the one face.

On completion of the weaving of the towel incorporating the panel as described above, the towel can be dyed according to conventional techniques. However the synthetic fibre, because of its nature, will not accept the dye. The result is that the one face of the panel which is predominantly formed by the synthetic fibre will remain undyed while the other face of the panel which is predominantly formed of cotton fibre does accept the dye and will be in conformity with the remainder of the towel.

Once the dying of the towel has been completed, the panel is then placed in a press and the one face is subjected to pressure and heat by means of a heated platen whereby as a result of the high pressure and heat applied to the one face of the panel, the synthetic fibres formed on the one face are softened and become fused together. In the weaving of the synthetic weft yarns on the one face, there is sufficient bulk in the fibres such that on them becoming compressed and fused by the heated platen they form a substantially smooth or silky surface in which the cotton weft yarns which also lie on the one face are effectively embedded. The one face then has a printed pattern applied to it by application of a printed transfer master by application of the appropriate heat and pressure.

In the heating and compression of the panel, the cotton fibres located on the other side of the panel are stabilised by their contact with the inside face of the synthetic fibres with which they come into contact, whereby the previously loose nature of the cotton layer is eliminated.

According to a preferred form of the embodiment, the fusing and compression of the fibres on the one face of the panel by the application of heat and pressure and the application of the printed pattern by means of the transfer master can be effected simultaneously. This is done by applying the master of the transfer which bears the printed pattern in position on the one face of the header panel and then placing the panel within a press whereby the movable heated platen is applied over the one face of the panel with the transfer master located between the one face and the heated platen. The application of the heat and pressure to the one face partially melts the synthetic fibres and causes them to be bonded one to another while the printed pattern is applied to the surface of the fused layer of fibres.

The result of the process of the embodiment is a towel having a panel which has one face which is formed with a smooth silky finish having a printed pattern applied to it and where the other face is formed substantially of the same material and has the same colouring as the remainder of the towel.

Furthermore, the printed pattern which has been applied to the one face of the panel is resistant to washing and the other usual requirements of the towel and the pattern can be one having a higher definition of the pattern and than has previously been possible.

The second embodiment is a variation of the first embodiment and comprises using a heated platen which is formed with a relief pattern. The platen can be formed with the pattern by a photo engraving or etching technique. The application of the engraved platen to the panel results in the fusible fibre of the panel being fused to form a relief pattern in addition to the printed pattern whereby the two forms of pattern can complement each other to provide a visually distinctive panel.

The third embodiment relates to a method of providing a towel having a panel with a relief pattern only. The method is a variation of the second embodiment in that the printed transfer is not applied to the panel and whereby a relief pattern only is formed in the surface of the header panel. The surface of the fabric forming the pattern has a smooth or "silky" texture as a result of the application of the heat and pressure.

The fourth embodiment of the invention comprises a variation of the third embodiment and uses a viscose fibre as the synthetic fusible fibre. According to the embodiment, the fibre is spun to form a coarse viscose chenille yarn and the loopless panel is woven using the yarn. This results in the panel having a soft, spongy and velvety surface. Because of the nature of the viscose fibres, the panel will dye in the same manner as the rest of the towel. In forming the pattern on the panel an engraved heated platen is applied on to one or both sides of the panel. The heat of the platen fuses the viscose fibre in contact with it and causes the surface of the header panel to form to accommodate the surface of the platen. This results in the creation of a noble complex patterning on the header panel which can be of a similar form to a wood carving.

The degree of accuracy and detail of the relief that can be attained by the second, third and fourth embodiments cannot be replicated by any conventional techniques.

It should be appreciated that the scope of the present invention need not be limited to the particular scope of the embodiment described above.

What is claimed:

1. A method of manufacturing an item formed of terry cloth having a decorative panel comprising; weaving an item of terry cloth with a panel which is loopless and is double-sided where at least one face of the panel is substantially formed of synthetic fusible fibre, applying heat and pressure to the at least one face to at least partially fuse the fusible fibre and to form a patterned surface on the at least one face.

2. A method as claimed at claim 1 wherein the one face of the terry cloth item is formed from synthetic fusible fibre and the other face is substantially formed from fibre corresponding to the remainder of the terry cloth item.

3. A method as claimed at claim 1 wherein both faces of the panel are formed of synthetic fusible fibre.

4. A method as claimed at claim 1 wherein the synthetic fusible fibre comprises polyester fibre.

5. A method as claimed in claim 1 wherein those portions of the terry cloth item not formed of said fusible fibre are formed of cotton fibre.

6. A method as claimed in claim 1, wherein the application of heat and pressure to the at least one face is effected so as to form a substantially smooth and uniform surface; and wherein a decorative printed pattern is applied to the one face to provide the patterned surface.

7. A method as claimed at claim 6 wherein the one face of the terry cloth item is formed from synthetic fusible fibre and the other face is formed from fibre corresponding to the remainder of the terry cloth item.

8. A method as claimed at claim 6 in therein both faces of the panel are formed of synthetic fusible fibre.

9. A method as claimed at claim 6 wherein the synthetic fusible fibre comprises polyester fibre.

10. A method as claimed in claim 6 wherein those portions of the terry cloth item not formed of said fusible fibre are formed of cotton fibre.

11. A method as claimed at claim 6 wherein the application of heat, pressure and the printed pattern is effected substantially simultaneously.

12. A method as claimed at claim 6 wherein the printed pattern is three dimensional.

13. A method as claimed at claim 12 wherein the application of heat and pressure is effected by applying a heated platen under pressure to the at least one face wherein the surface of the platen is formed with a relief pattern.

14. A method as claimed at claim 13 wherein the relief pattern corresponds with at least a portion of the printed pattern.

15. A method as claimed in claim 1 wherein the application of heat and pressure to the at least one face is effected so as to form a patterned surface comprising a relief pattern.

16. A method as claimed at claim 15 wherein the one face of the terry cloth item is formed from synthetic fusible fibre and the other face is substantially formed from fibre corresponding to the remainder of the terry cloth item.

17. A method as claimed at claim 15, wherein both faces of the panel are formed of synthetic fusible fibre.

18. A method as claimed at claim 15 wherein the synthetic fusible fibre comprises polyester fibre.

19. A method as claimed at claim 15 wherein the synthetic fusible fibre comprises viscose fibre.

20. A method as claimed at claim 19 wherein the viscose fibre is in the form of coarse viscose chenille yarn.

21. A method as claimed at claim 15 wherein the other face of the terry cloth item and the remainder of the terry cloth item is substantially formed of cotton fibre.

22. A method as claimed in claim 1, 6, 12, 13 or 15 wherein the terry cloth item is a towel.

23. A method as claimed in claim 6, wherein the synthetic fusible fibre is at least partially melted by said heat and pressure.

24. A method as claimed in claim 6, wherein the fusible fibre is at least partially fused together by said heat and pressure.

25. A method as claimed in claim 2 wherein those portions of the terry cloth item not formed of said fusible fibre are formed of cotton fibre.

26. A method as claimed in claim 3 wherein those portions of the terry cloth item not formed of said fusible fibre are formed of cotton fibre.

27. A method as claimed in claim 2, wherein the synthetic fusible fibre comprises polyester fibre.

28. A method as claimed in claim 3, wherein the synthetic fusible fibre comprises polyester fibre.

29. A method as claimed in claim 5, wherein the synthetic fusible fibre comprises polyester fibre.

30. A method as claimed in claim 25, wherein the synthetic fusible fibre comprises polyester fibre.

31. A method as claimed in claim 26, wherein the synthetic fusible fibre comprises polyester fibre.

32. A method as claimed in claim 11, wherein the printed pattern is three-dimensional.

33. A method as claimed in claim 32, wherein the application of heat and pressure is effected by applying a heated platen under pressure to the at least one face, wherein the surface of the platen is formed with a relief pattern.

34. A method as claimed in claim 33, wherein the relief pattern corresponds with at least a portion of the printed pattern.

35. A method as claimed in claim 11, wherein those portions of the terry cloth item not formed of said fusible fibre are formed of cotton fibre.

36. A method as claimed in claim 12, wherein those portions of the terry cloth item not formed of said fusible fibre are formed of cotton fibre.

37. A method as claimed in claim 32, wherein those portions of the terry cloth item not formed of said fusible fibre are formed of cotton fibre.

38. A method as claimed in claim 13, wherein those portions of the terry cloth item not formed of said fusible fibre are formed of cotton fibre.

39. A method as claimed in claim 33, wherein those portions of-the terry cloth item not formed of said fusible fibre are formed of cotton fibre.

40. A method as claimed in claim 14, wherein those portions of the terry cloth item not formed of said fusible fibre are formed of cotton fibre.

41. A method as claimed in claim 34, wherein those portions of the terry cloth item not formed of said fusible fibre are formed of cotton fibre.

42. A method as claimed in claim 11, wherein the synthetic fusible fibre comprises polyester fibre.

43. A method as claimed in claim 12, wherein the synthetic fusible fibre comprises polyester fibre.

44. A method as claimed in claim 32, wherein the synthetic fusible fibre comprises polyester fibre.

45. A method as claimed in claim 13, wherein the synthetic fusible fibre comprises polyester fibre.

46. A method as claimed in claim 33, wherein the synthetic fusible fibre comprises polyester fibre.

47. A method as claimed in claim 14, wherein the synthetic fusible fibre comprises polyester fibre.

48. A method as claimed in claim 34, wherein the synthetic fusible fibre comprises polyester fibre.

49. A method as claimed in claim 10, wherein the synthetic fusible fibre comprises polyester fibre.

50. A method as claimed in claim 35, wherein the synthetic fusible fibre comprises polyester fibre.

51. A method as claimed in claim 36, wherein the synthetic fusible fibre comprises polyester fibre.

52. A method as claimed in claim 37, wherein the synthetic fusible fibre comprises polyester fibre.

53. A method as claimed in claim 38, wherein the synthetic fusible fibre comprises polyester fibre.

54. A method as claimed in claim 39, wherein the synthetic fussible fibre comprises polyester fibre.

55. A method as claimed in claim 40, wherein the synthetic fusible fibre comprises polyester fibre.

56. A method as claimed in claim 41, wherein the synthetic fusible fibre comprises polyester fibre.

57. A method as claimed in claim 2, wherein the application of heat and pressure to the at least one face is effected so as to form a patterned surface comprising a relief pattern.

58. A method as claimed in claim 3, wherein the application of heat and pressure to the at least one face is effected so as to form a patterned surface comprising a relief pattern.

59. A method as claimed in claim 57, wherein the synthetic fusible fibre comprises viscose fibre.

60. A method as claimed in claim 58, wherein the synthetic fusible fibre comprises viscose fibre.

61. A method as claimed in claim 59, wherein the viscose fibre is in the form of coarse viscose chenille yarn.

62. A method as claimed in claim 60, wherein the viscose fibre is in the form of coarse viscose chenille yarn.

63. A method as claimed in claim 1, wherein the synthetic fusible fibre is at least partially melted by said heat and pressure.

64. A method as claimed in claim 13, wherein the synthetic fusible fibre is at least partially melted by said heat and pressure.

65. A method as claimed in claim 14, wherein the synthetic fusible fibre is at least partially melted by said heat and pressure.

66. A method as claimed in claim 15, wherein the synthetic fusible fibre is at least partially melted by said heat and pressure.

67. A method as claimed in claim 1, wherein the fusible fibre is at least partially fused together by said heat and pressure.

68. A method as claimed in claim 13, wherein the fusible fibre is at least partially fused together by said heat and pressure.

69. A method as claimed in claim 14, wherein the fusible fibre is at least partially fused together by said heat and pressure.

70. A method as claimed in claim 15, wherein the fusible fibre is at least partially fused together by said heat and pressure.

71. An item formed of terry cloth having a panel which is loopless and is double-sided; wherein
   at least one face of the panel is woven to be substantially formed of synthetic fusible fibre; and
   the fusible fibre of the at least one face is at least partially fused to form a patterned surface on the at least one face.

72. An item of terry cloth as claimed in claim 71, wherein the one face of the panel is formed of synthetic fusible fibre and the other face of the panel is formed from fibre corresponding to the remainder of the terry cloth item.

73. An item of terry cloth as claimed in claim 71, wherein both faces of the panel are formed of synthetic fusible fibre.

74. An item of terry cloth as claimed in claim 71, wherein those portions of the terry cloth item not formed of said fusible fibre are formed of cotton fibre.

75. An item of terry cloth as claimed in claim 72, wherein those portions of the terry cloth item not formed of said fusible fibre-are formed of cotton fibre.

76. An item of terry cloth as claimed in claim 73, wherein those portions of the terry cloth item not formed of said fusible fibre are formed of cotton fibre.

77. An item of terry cloth as claimed in claim 71, wherein the synthetic fusible fibre comprises polyester fibre.

78. An item of terry cloth as claimed in claim 72, wherein the synthetic fusible fibre comprises polyester fibre.

79. An item of terry cloth as claimed in claim 73, wherein the synthetic fusible fibre comprises polyester fibre.

80. An item of terry cloth as claimed in claim 74, wherein-the'synthetic fusible fibre comprises polyester fibre.

81. An item of terry cloth as claimed in claim 75, wherein the synthetic fusible fibre comprises polyester fibre.

82. An item of terry cloth as claimed in claim 76, wherein the synthetic fusible fibre comprises polyester fibre.

83. An item of terry cloth as claimed in claim 71, wherein the at least one face is substantially smooth and uniform and is provided with a decorative printed pattern.

84. An item of terry cloth as claimed in claim 72, wherein the at least one face is substantially smooth and uniform and is provided with a decorative printed pattern.

85. An item of terry cloth as claimed in claim 73, wherein the at least one face is substantially smooth and uniform and is provided with a decorative printed pattern.

86. An item of terry cloth as claimed in claim 74, wherein the at least one face is substantially smooth and uniform and is provided with a decorative printed pattern.

87. An item of terry cloth as claimed in claim 75, wherein the at least one face is substantially smooth and uniform and is provided with a decorative printed pattern.

88. An item of terry cloth as claimed in claim 76, wherein the at least one face is substantially smooth and uniform and is provided with a decorative printed pattern.

89. An item of terry cloth as claimed in claim 77, wherein the at least one face is substantially smooth and uniform and is provided with a decorative printed pattern.

90. An item of terry cloth as claimed in claim 78, wherein the at least one face is substantially smooth and uniform and is provided with a decorative printed pattern.

91. An item of terry cloth as claimed in claim 79, wherein the at least one face is substantially smooth and uniform and is provided with a decorative printed pattern.

92. An item of terry cloth as claimed in claim 80, wherein the at least one face is substantially smooth and uniform and is provided with a decorative printed pattern.

93. An item of terry cloth as claimed in claim 81, wherein the at least one face is substantially smooth and uniform and is provided with a decorative printed pattern.

94. An item of terry cloth as claimed in claim 82, wherein the at least one face is substantially smooth and uniform and is provided with a decorative printed pattern.

95. An item of terry cloth as claimed in claim 71, wherein the patterned surface comprises a relief pattern.

96. An item of terry cloth as claimed in claim 72, wherein the patterned surface comprises a relief pattern.

97. An item of terry cloth as claimed in claim 73, wherein the patterned surface comprises a relief pattern.

98. An item of terry cloth as claimed in claim 74, wherein the patterned surface comprises a relief pattern.

99. An item of terry cloth as claimed in claim 75, wherein the patterned surface comprises a relief pattern.

100. An item of terry cloth as claimed in claim 76, wherein the patterned surface comprises a relief pattern.

101. An item of terry cloth as claimed in claim 83, wherein the patterned surface comprises a relief pattern.

102. An item of terry cloth as claimed in claim 84, wherein the patterned surface comprises a relief pattern.

103. An item of terry cloth as claimed in claim 85, wherein the patterned surface comprises a relief pattern.

104. An item of terry cloth as claimed in claim 86, wherein the patterned surface comprises a relief pattern.

105. An item of terry cloth as claimed in claim 87, wherein the patterned surface comprises a relief pattern.

106. An item of terry cloth as claimed in claim 88, wherein the patterned surface comprises a relief pattern.

107. An item of terry cloth as claimed in claim 95, wherein the synthetic fusible fibre comprises viscose fibre.

108. An item of terry cloth as claimed in claim 96, wherein the synthetic fusible fibre comprises viscose fibre.

109. An item of terry cloth as claimed in claim 97, wherein the synthetic fusible fibre comprises viscose fibre.

110. An item of terry cloth as claimed in claim 98, wherein the synthetic fusible fibre comprises viscose fibre.

111. An item of terry cloth as claimed in claim 99, wherein the synthetic fusible fibre comprises viscose fibre.

112. An item of terry cloth as claimed in claim 100, wherein the synthetic fusible fibre comprises viscose fibre.

113. An item of terry cloth as claimed in claim 101, wherein the synthetic fusible fibre comprises viscose fibre.

114. An item of terry cloth as claimed in claim 102, wherein the synthetic fusible fibre comprises viscose fibre.

115. An item of terry cloth as claimed in claim 103, wherein the synthetic fusible fibre comprises viscose fibre.

116. An item of terry cloth as claimed in claim 104, wherein the synthetic fusible fibre comprises viscose fibre.

117. An item of terry cloth as claimed in claim 108, wherein the synthetic fusible fibre comprises viscose fibre.

118. An item of terry cloth as claimed in claim 106, wherein the synthetic fusible fibre comprises viscose fibre.

119. An item of terry cloth as claimed in claim 102, wherein the viscose fibre is in the form of coarse viscose chenille yarn.

120. An item of terry cloth as claimed in claim 71, 83, 95 or 102 wherein the terry cloth item is towel.

* * * * *